(12) United States Patent
Acharya et al.

(10) Patent No.: US 7,241,516 B1
(45) Date of Patent: Jul. 10, 2007

(54) SOFT MAGNETIC UNDERLAYER WITH EXCHANGE COUPLING INDUCED ANISOTROPY FOR PERPENDICULAR MAGNETIC RECORDING MEDIA

(75) Inventors: B. Ramamurthy Acharya, Cupertino, CA (US); Jianing Zhou, Fremont, CA (US); Gunn Choe, San Jose, CA (US); Min Zheng, Milpitas, CA (US)

(73) Assignee: Maxtor Corporation, Scotts Valley, CA (US)

( * ) Notice: Subject to any disclaimer, the term of this patent is extended or adjusted under 35 U.S.C. 154(b) by 357 days.

(21) Appl. No.: 10/792,328

(22) Filed: Mar. 3, 2004

Related U.S. Application Data

(60) Provisional application No. 60/484,765, filed on Jul. 3, 2003, provisional application No. 60/451,556, filed on Mar. 3, 2003.

(51) Int. Cl.
*G11B 5/66* (2006.01)
*G11B 5/70* (2006.01)

(52) U.S. Cl. .................................. 428/828.1

(58) Field of Classification Search ............... 428/828, 428/828.1
See application file for complete search history.

(56) References Cited

U.S. PATENT DOCUMENTS

| 4,656,546 | A | 4/1987 | Mallory ..................... 360/110 |
| 4,748,525 | A | 5/1988 | Perlov ........................ 360/110 |
| 6,686,070 | B1 * | 2/2004 | Futamoto et al. ........... 428/827 |
| 6,818,330 | B2 * | 11/2004 | Shukh et al. ............... 428/828 |
| 6,835,475 | B2 * | 12/2004 | Carey et al. ............. 428/828.1 |
| 2002/0028357 | A1 | 3/2002 | Shukh et al. |
| 2003/0022023 | A1 | 1/2003 | Carey et al. |
| 2004/0062953 | A1 * | 4/2004 | Futamoto et al. ...... 428/694 TS |

* cited by examiner

*Primary Examiner*—Holly Rickman

(57) ABSTRACT

An improved soft underlayer structure for perpendicular magnetic recording. The structure includes at least two soft underlayers separated by a non-magnetic spacer layer. The soft underlayer structure incorporates exchange coupling induced anisotropy for improved perpendicular magnetic recording properties, including an improved signal-to-noise ratio (SNR) and reduced adjacent track erasure.

17 Claims, 9 Drawing Sheets

SOFT MAGNETIC UNDERLAYER WITH EXCHANGE COUPLING INDUCED ANISOTROPY FOR PERPENDICULAR MAGNETIC RECORDING MEDIA

CROSS-REFERENCE TO RELATED APPLICATIONS

This application claims priority to U.S. Provisional Patent Application Ser. No. 60/451,556, filed Mar. 3, 2003, and to U.S. Provisional Patent Application Ser. No. 60/484,765, filed Jul. 3, 2003. Each of the foregoing U.S. Provisional Patent Applications is incorporated herein by reference in its entirety.

BACKGROUND OF THE INVENTION

1. Field of the Invention

The present invention is directed to a perpendicular magnetic recording medium. In particular, the present invention is directed to a perpendicular magnetic recording medium that includes a soft magnetic underlayer that incorporates exchange coupling induced anisotropy for improved magnetic recording properties, including an improved signal-to-noise ratio (SNR) and reduced adjacent track erasure.

2. Description of Related Art

Thin film magnetic recording media are composed of multiple layers, including one or more magnetic recording layers, disposed on a substrate. Typically, the magnetic recording layer includes small magnetic grains that have an easy magnetization axis that is magnetically oriented longitudinally (i.e., in plane) with respect to the magnetic layer.

The areal density of longitudinal magnetic recording media has been increasing at a compounded growth rate of about 60% per year and areal densities as high as 100 gigabits per square inch (Gbit/in$^2$) have been demonstrated. Scaling longitudinal recording media to higher areal densities requires smaller magnetic grains. However, as the grain size is reduced, thermal fluctuations can cause the magnetic domains to "flip", causing a loss of magnetization over a period of time. Media having a higher magnetic coercivity and an increased track density (tracks per inch, or TPI) can mitigate this problem. However, the large write head gaps that are needed for good overwrite of high coercivity media lead to excessive fringing, negatively affecting the data written on adjacent tracks.

Perpendicular (vertical) magnetic recording media have been proposed as a way to increase areal densities beyond 100 Gb/in$^2$. Perpendicular magnetic recording media include a magnetic recording layer having an easy magnetization axis that is substantially perpendicular to the magnetic layer. A perpendicular write head, such as a monopole write head or a shielded pole write head, is utilized to magnetize the grains in the perpendicular recording layer. Examples of perpendicular recording media and perpendicular write heads are disclosed in U.S. Pat. No. 4,656,546 by Mallary and U.S. Pat. No. 4,748,525 by Perlov, which are incorporated herein by reference in their entirety.

The write head for perpendicular recording includes a write pole and a return pole that is coupled to the write pole. An electrically conductive magnetizing coil surrounds the yoke of the write pole to switch the polarity of the magnetic field applied to the write pole. During operation, the recording head flies above the magnetic recording medium by a distance referred to as the fly height. An electrical current is passed through the coil to create a magnetic flux within the write pole. The magnetic flux passes from the write pole tip through the magnetic recording layer and into a magnetically soft underlayer disposed beneath the magnetic recording layer. The soft magnetic underlayer causes the magnetic flux to pass across to the return pole. In addition, the soft underlayer produces magnetic charge images of the magnetic recording layer during read operations, increasing the magnetic flux and increasing the playback signal.

Perpendicular recording media can support higher areal densities than conventional longitudinal media, in part due to reduced demagnetizing fields in the recording transitions. While substantial advances have been made, further improvements in the magnetic recording media are necessary for the practical implementation of perpendicular magnetic recording devices. For example, the soft underlayer domains contribute to noise and lead to a lower signal-to-noise ratio (SNR). The magnetic domains in the soft underlayer also increase spike noises. Further, the remnant magnetization from the soft underlayer can lead to distortions in the giant magnetoresistive (GMR) read sensitivity. Therefore, the soft underlayer should have high magnetization and permeability from the writing point of view and almost zero remnant magnetization from the reading point of view.

U.S. patent application Publication No. U.S. 2002/0028357 by Shukh et al. discloses a perpendicular magnetic recording medium with anti-ferro magnetic coupling in a soft magnetic underlayer. The soft magnetic underlayer includes a first magnetic soft layer, a first interface layer on the first magnetic soft layer, a second magnetic soft layer, a second interface layer on a second magnetic soft layer and a non-magnetic coupling layer between the first interface layer and the second interface layer.

U.S. patent application Publication No. U.S. 2003/0022023 by Carey et al. discloses a dual-layered type perpendicular magnetic recording disk for use in a perpendicular magnetic recording system. The magnetic recording disk includes a laminated underlayer that has at least two ferromagnetic films exchange-coupled across an anti-ferromagnetic coupling layer. The magnetic moments of the ferromagnetic layers in the laminated underlayer are oriented anti-parallel.

During the repeated application of magnetic fields from the head to write information on any particular track on the recording media, the leakage fields from the head can erase the information written on the adjacent tracks. This adjacent track erasure is considered to be a major hurdle to the implementation of perpendicular recording, particularly due to the magnification of head leakage fields by the magnetically soft underlayer that is necessary for perpendicular recording media.

There remains a need for an improved perpendicular recording medium having improved signal-to-noise ratio (SNR), a decreased pulse width (PW$_{50}$) and reduced adjacent track erasure.

BRIEF SUMMARY OF THE INVENTION

The present invention provides an improved perpendicular recording medium. The recording medium consists of at least a pair of soft magnetic layers, which are anti-parallel coupled through a non-magnetic coupling layer, such as a ruthenium (Ru) layer. The remnant magnetization of the soft underlayer structure is substantially reduced compared to conventional soft underlayer structures, leading to a reduction of domain noise. The magnetic anisotropy of the soft underlayer is controlled by adjusting the thickness of the magnetically soft underlayers, which results in different magnitudes of anti-parallel exchange field. The structure according to the present invention can advantageously decrease the pulse width ($PW_{50}$), improve the signal-to-noise ratio (SNR) and reduce adjacent track erasure.

According to one embodiment of the present invention, a magnetic recording medium for perpendicular recording is provided. The magnetic recording medium includes a substrate, an underlayer structure disposed over the substrate, an intermediate layer disposed over the underlayer structure and a perpendicular magnetic recording layer disposed over the intermediate layer. The underlayer structure includes a first soft magnetic underlayer having a first thickness, a second soft magnetic underlayer disposed over the first soft underlayer and having a second thickness, wherein the first thickness is greater than the second thickness. A non-magnetic spacer layer is disposed between the first and second soft magnetic underlayers and the first and second soft magnetic underlayers are anti-parallel coupled through the non-magnetic spacer layer.

According to another embodiment of the present invention, a magnetic recording medium for perpendicular recording is provided. The magnetic recording medium includes a substrate, an underlayer structure disposed over the substrate, an intermediate layer disposed over the underlayer structure and a perpendicular magnetic recording layer disposed over the intermediate layer. The underlayer structure includes a first soft magnetic underlayer having a first thickness, a second soft magnetic underlayer and a third soft magnetic underlayer disposed over the first soft underlayer. A first non-magnetic spacer layer is disposed between the first and second soft magnetic underlayers and a second non-magnetic spacer layer is disposed between the second and third soft magnetic underlayers. The second and third soft magnetic underlayers are anti-parallel coupled through the second non-magnetic spacer layer.

According to another embodiment of the present invention, a magnetic recording medium for perpendicular recording is provided. The magnetic recording medium includes a substrate, an underlayer structure, an intermediate layer disposed over the underlayer structure and a perpendicular magnetic recording layer disposed over the intermediate layer. The underlayer structure includes a first soft magnetic underlayer having a first saturation magnetization ($M_s$) and a second soft magnetic underlayer having a second saturation magnetization, where the second saturation magnetization is greater than the first saturation magnetization. A spacer layer is disposed between the first and second soft magnetic underlayers.

DETAILED DESCRIPTION OF THE INVENTION

The present invention is directed to a magnetic recording medium including a perpendicular magnetic recording layer. As used herein, a perpendicular magnetic recording layer is a magnetic recording layer where the magnetic grains have an easy magnetization axis that is oriented substantially perpendicular to the plane of the layer (i.e., the radial axis). The magnetic recording medium can be, for example, a magnetic tape or a magnetic hard disk, and in a preferred embodiment is a magnetic hard disk, such as for use in a disk drive.

Figure 1:
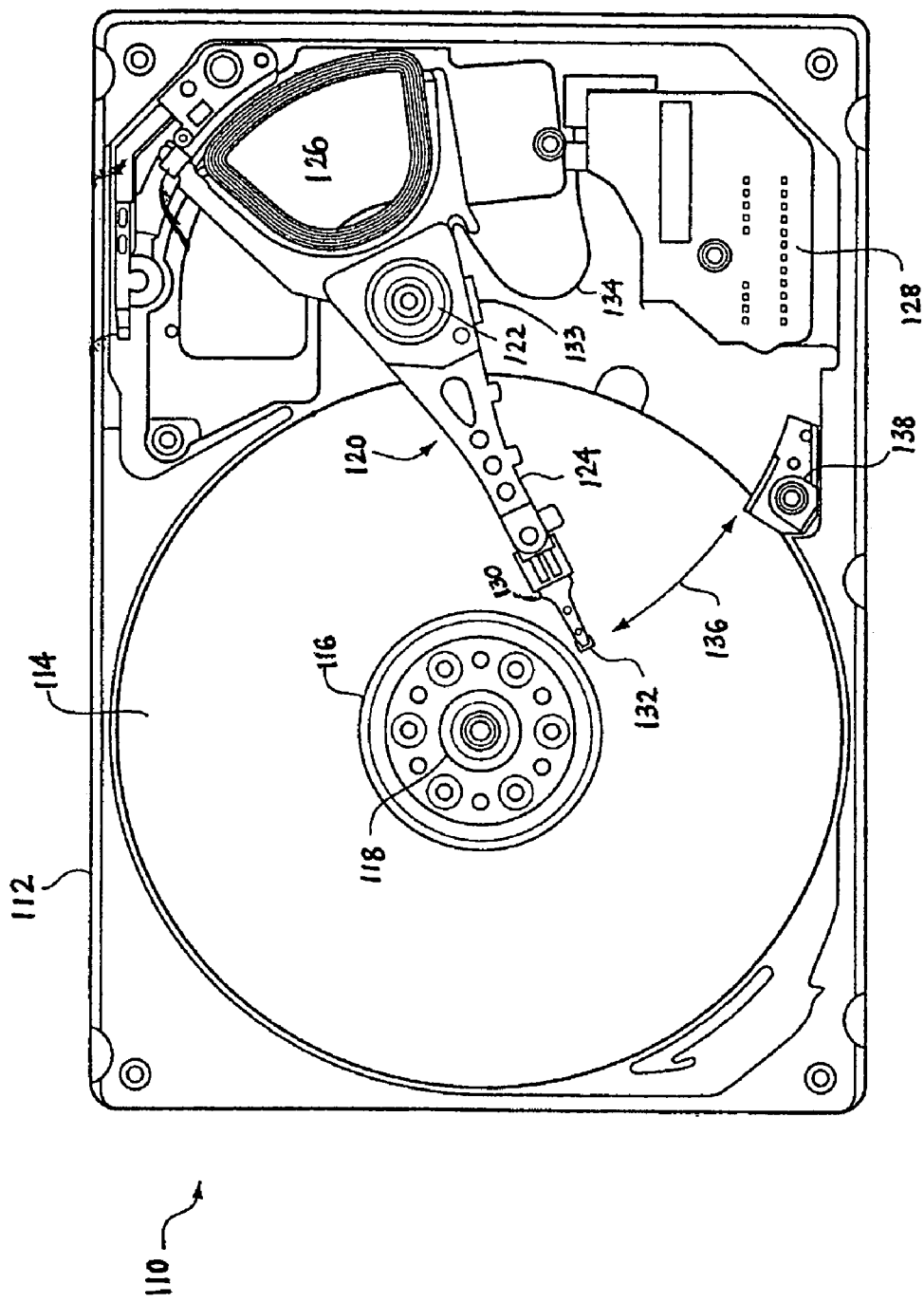
FIG. 1 illustrates a top plan view of a disk drive device.

FIG. 1 illustrates one embodiment of a disk drive 110. The disk drive 110 generally includes a base plate 112 and a cover (not shown) that may be disposed on the base plate 112 to define an enclosed housing or space for the various disk drive components. The disk drive 110 includes one or more data storage disks 114 of any appropriate computer-readable data storage media. Typically, both of the major surfaces of each data storage disk 114 include a plurality of concentrically disposed tracks for data storage purposes. Each disk 114 is mounted on a hub or spindle 116, which in turn is rotatably interconnected with the disk drive base plate 112 and/or cover. Multiple data storage disks 114 are typically mounted in vertically spaced and parallel relation on the spindle 116. Rotation of the disk(s) 114 is provided by a spindle motor 118 that is coupled to the spindle 116 to simultaneously spin the data storage disk(s) 114 at an appropriate rate.

The disk drive 110 also includes an actuator arm assembly 120 that pivots about a pivot bearing 122, which in turn is rotatably supported by the base plate 112 and/or cover. The actuator arm assembly 120 includes one or more individual rigid actuator arms 124 that extend out from near the pivot bearing 122. Multiple actuator arms 124 are typically disposed in vertically spaced relation, with one actuator arm 124 being provided for each major data storage surface of each data storage disk 114 of the disk drive 110. Other types of actuator arm assembly configurations could be utilized as well, such as an "E" block having one or more rigid actuator arm tips or the like that cantilever from a common structure. In any case, movement of the actuator arm assembly 120 is provided by an actuator arm drive assembly, such as a voice coil motor 126 or the like. The voice coil motor 126 is a magnetic assembly that controls the operation of the actuator arm assembly 120 under the direction of control electronics 128. Any appropriate actuator arm assembly drive type may be utilized by the disk drive 110, including a linear drive (for the case where the actuator arm assembly 120 is interconnected with the base plate 112 and/or cover for linear movement versus the illustrated pivoting movement about the pivot bearing 122) and other types of rotational drives.

A load beam or suspension 130 is attached to the free end of each actuator arm 124 and cantilevers therefrom. Typically, the suspension 130 is biased generally toward its corresponding disk 114 by a spring-like force. A slider 132 is disposed at or near the free end of each suspension 130. What is commonly referred to as the read/write head (e.g., transducer) is appropriately mounted on the slider 132 and is used in disk drive read/write operations.

The head on the slider 132 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2–4%. GMR results from spin-dependent scattering mechanisms between two (or more) magnetic layers. The typical use in recording heads is the spin valve device that uses a pinned magnetic layer and a free layer to detect external fields. The normalized change in on-wafer resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by an insulating layer of $Al_2O_3$ with the current flowing perpendicular to the film plane, producing normalized change in resistance of 12–25%. The term magnetoresistive is used in this application to refer to all these types of magnetoresistive sensors and any others in which a variation in resistance of the sensor due to the application of an external magnetic field is detected. The read/write head of the present invention is discussed in further detail below.

The biasing forces exerted by the suspension 130 on its corresponding slider 132 moves the slider 132 in the direction of its corresponding disk 114. Typically, this biasing force is such that if the slider 132 were positioned over its corresponding disk 114, without the disk 114 being rotated at a sufficient velocity, the slider 132 would be in contact with the disk 114.

The head on the slider 132 is connected to a preamplifier 133, which is interconnected with the control electronics 128 of the disk drive 110 by a flex cable 134 that is typically mounted on the actuator arm assembly 120. Signals are exchanged between the head and its corresponding data storage disk 114 for disk drive read/write operations. In this regard, the voice coil motor 126 is utilized to pivot the actuator arm assembly 120 to simultaneously move the slider 132 along a path 136 and "across" the corresponding data storage disk 114 to position the head at the desired/required radial position on the disk 114 (i.e., at the approximate location of the correct track on the data storage disk 114) for disk drive read/write operations.

When the disk drive 110 is not in operation, the actuator arm assembly 120 is pivoted to a "parked position" to dispose each slider 132 generally at or beyond a perimeter of its corresponding data storage disk 114, but in any case in vertically spaced relation to its corresponding disk 114. This is commonly referred to in the art as being a dynamic load/unload disk drive configuration. In this regard, the disk drive 110 includes a ramp assembly 138 that is disposed beyond a perimeter of the data storage disk 114 to typically both move the corresponding slider 132 vertically away from its corresponding data storage disk 114 and to also exert somewhat of a retaining force on the actuator arm assembly 120. Any configuration for the ramp assembly 138 that provides the desired "parking" function may be utilized. The disk drive 110 could also be configured to be of the contact start/stop type, where the actuator arm assembly 120 would pivot in a direction to dispose the slider(s) 132 typically toward an inner, non-data storage region of the corresponding data storage disk 114. Terminating the rotation of the data storage disk(s) 114 in this type of disk drive configuration would then result in the slider(s) 132 actually establishing contact with or "landing" on its corresponding data storage disk 114, and the slider 132 would remain on the disk 114 until disk drive operations are re-initiated.

The slider 132 of the disk drive 110 may be configured to "fly" on an air bearing during rotation of its corresponding data storage disk(s) 114 at a sufficient velocity. The slider 132 may be disposed at a pitch angle such that its leading edge is disposed further from its corresponding data storage disk 114 than its trailing edge. The read/write head would typically be incorporated on the slider 132 generally toward its trailing edge since this is positioned closest to its corresponding disk 114. Other pitch angles/orientations could also be utilized for flying the slider 132.

The present invention is directed to perpendicular recording media, such as one that is useful in a disk drive device as illustrated in FIG. 1. The perpendicular recording media includes a perpendicular magnetic recording layer and a multi-layer soft underlayer structure disposed beneath the magnetic recording layer.

Figure 2:
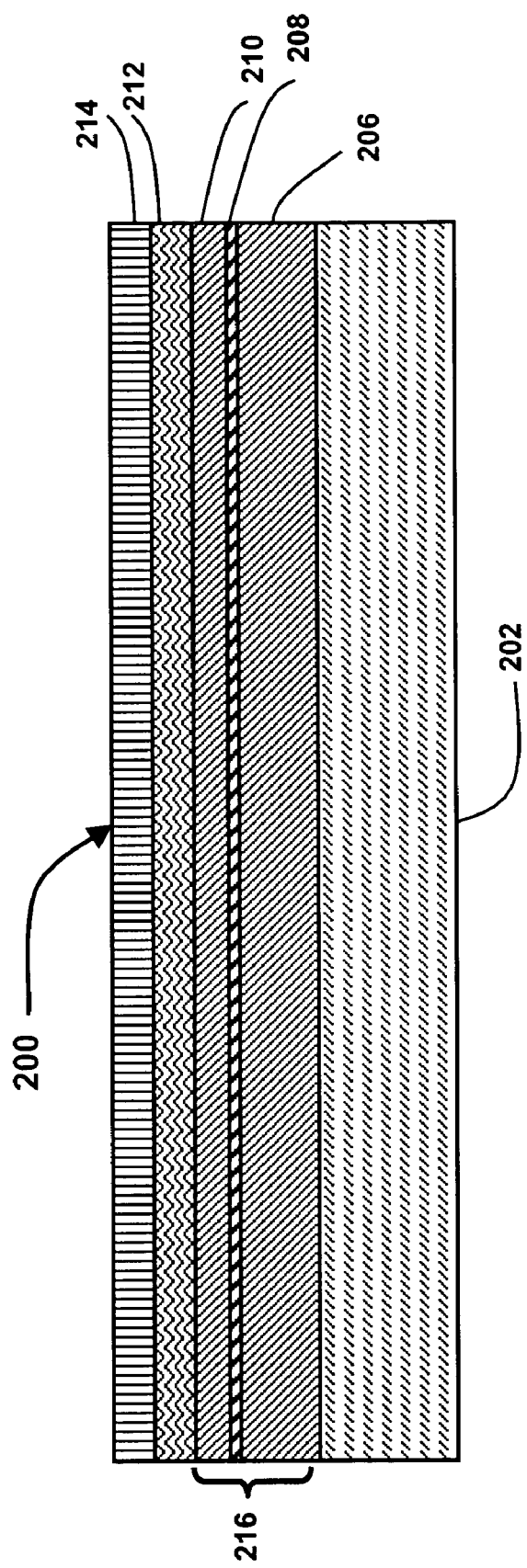
FIG. 2 illustrates a cross-sectional view of a perpendicular recording medium according to an embodiment of the present invention.

FIG. 2 illustrates a cross-sectional view of a perpendicular magnetic recording medium according to an embodiment of the present invention that is useful in a disk drive device. The magnetic recording medium 200 includes multiple layers that are deposited upon a rigid substrate 202. Among the layers disposed on the rigid substrate 202 is a perpendicular magnetic recording layer 214. Disposed between the substrate 202 and the perpendicular magnetic recording layer 214 is a soft underlayer structure 216 in accordance with an embodiment of the present invention. Disposed between the soft underlayer structure 216 and the magnetic recording layer 214 is an intermediate layer 212. Through the use of this multi-layer soft underlayer structure, the perpendicular magnetic recording layer 214 can have significantly improved magnetic properties, enabling an increase in the areal density of the perpendicular magnetic recording medium.

The rigid substrate 202 can be fabricated from a number of materials known to those skilled in the art to be useful for magnetic recording media such as hard disks. A particularly preferred material for the rigid substrate 202 according to the present invention is aluminum (Al) coated with a layer of nickel phosphorous (NiP). However, it will be appreciated that the rigid substrate can also be fabricated from other materials, such as glass and glass-containing materials, including glass-ceramics. The rigid substrate 202 typically has an average thickness in the range of from about 10 mils to about 75 mils (about 0.254 millimeter to 1.9 millimeter) and has a smooth surface upon which the remaining layers can be deposited.

The soft underlayer structure 216 comprises a first soft magnetic underlayer 206 deposited over the substrate and a non-magnetic spacer 208 deposited over the first soft magnetic layer 206, and a second soft magnetic layer 210 deposited over the spacer 208. The soft magnetic layers 206 and 210 have a high permeability and a low coercivity. Preferably, the soft magnetic layers have a coercivity of not greater than about 10 oersteds (Oe) and a magnetic permeability of at least about 50. For example, the soft magnetic underlayers can be fabricated from soft magnetic materials such as CoZrNb, CoZrTa, FeCoB and FeTaC. It will be appreciated that the soft underlayers 206 and 210 can be fabricated from the same soft magnetic material, or from different soft magnetic materials.

The spacer layer 208 (or coupling layer) is fabricated from a non-magnetic material. Examples of non-magnetic materials include ruthenium (Ru), rhenium (Re), rhodium (Rh), chromium (Cr) and copper (Cu). Preferably, the spacer layer 208 is fabricated from Ru. The thickness of the non-magnetic spacer layer is selected to provide antiferromagnetic coupling between the two soft underlayers. The thickness of the spacer layer 208 causes the magnetization in the soft magnetic underlayers to be coupled in opposite directions (anti-parallel). According to one embodiment, the thickness of the spacer layer can be from about 0.5 nanometers to about 2 nanometers.

According to the present invention, the first soft underlayer 206 (disposed closest to the substrate) has an average thickness that is greater than the average thickness of the second soft underlayer 210. In one embodiment, the thickness of the second soft underlayer 210 is from about 10 percent to about 40 percent of the total thickness of the soft underlayer structure 216, which preferably has a total thickness of from about 50 nanometers to about 300 nanometers. In one embodiment, the thickness of the first soft underlayer can be from about 50 to 150 nanometers and the thickness of the second soft underlayer can be from about 10 nanometers to about 40 nanometers.

Disposed over the soft underlayer structure 216 is an intermediate layer 212. The thickness of the intermediate layer can preferably be from about 2 to about 50 nanometers. The intermediate layer 212 can be fabricated from materials such as, for example, Ru, Cr, Ta, Ni, Al or other alloys that result in good growth properties of the perpendicular magnetic layer 214. According to a preferred embodiment, the intermediate layer comprises two distinct sub-layers, such as a seedlayer of Ta, Ti or their alloys and having a thickness of from about 1 to 3 nanometers and an adjacent Ru or Ru alloy (e.g., RuCr) sub-layer having a thickness of from about 5 to about 40 nanometers, with the Ru or Ru alloy sub-layer being disposed adjacent to the magnetic recording layer.

The perpendicular magnetic recording layer 214 is deposited over the intermediate layer 212. The magnetic recording layer 214 has an easy magnetization axis (e.g., the C-axis) that is oriented perpendicular to the surface of the magnetic recording layer 214. Useful materials for the magnetic recording layer 214 include cobalt-based alloys having a hexagonal close packed (hcp) structure. Cobalt can be alloyed with elements such as chromium (Cr), platinum (Pt), boron (B), niobium (Nb), tungsten (W) and tantalum (Ta). In one preferred embodiment, the magnetic recording layer 214 includes cobalt alloyed with chromium (CoCr). As used herein, the term CoCr alloys can include alloys having other components in addition to Co and Cr. For example, a CoCr alloy can also include platinum (CoCrPt) and the CoCrPt alloy can include other elements such as boron (CoCrPtB). In addition, the magnetic recording layer can comprise an oxide, such as a CoCrPt-oxide or a CoCrPtB-oxide. Such oxides can further include silicon (Si), such as a CoCrPtSi-oxide or a CoCrPtBSi-oxide. The magnetic recording layer 214 preferably has an average thickness of at least about 1 nanometer, such as from about 15 nanometers to about 30 nanometers.

The perpendicular magnetic recording medium 200 can also include a protective layer (not illustrated) such as a protective carbon layer and a lubricant layer disposed over the protective layer. These layers are adapted to reduce damage from the read/write head interactions with the recording medium during start/stop operations.

Figure 3:
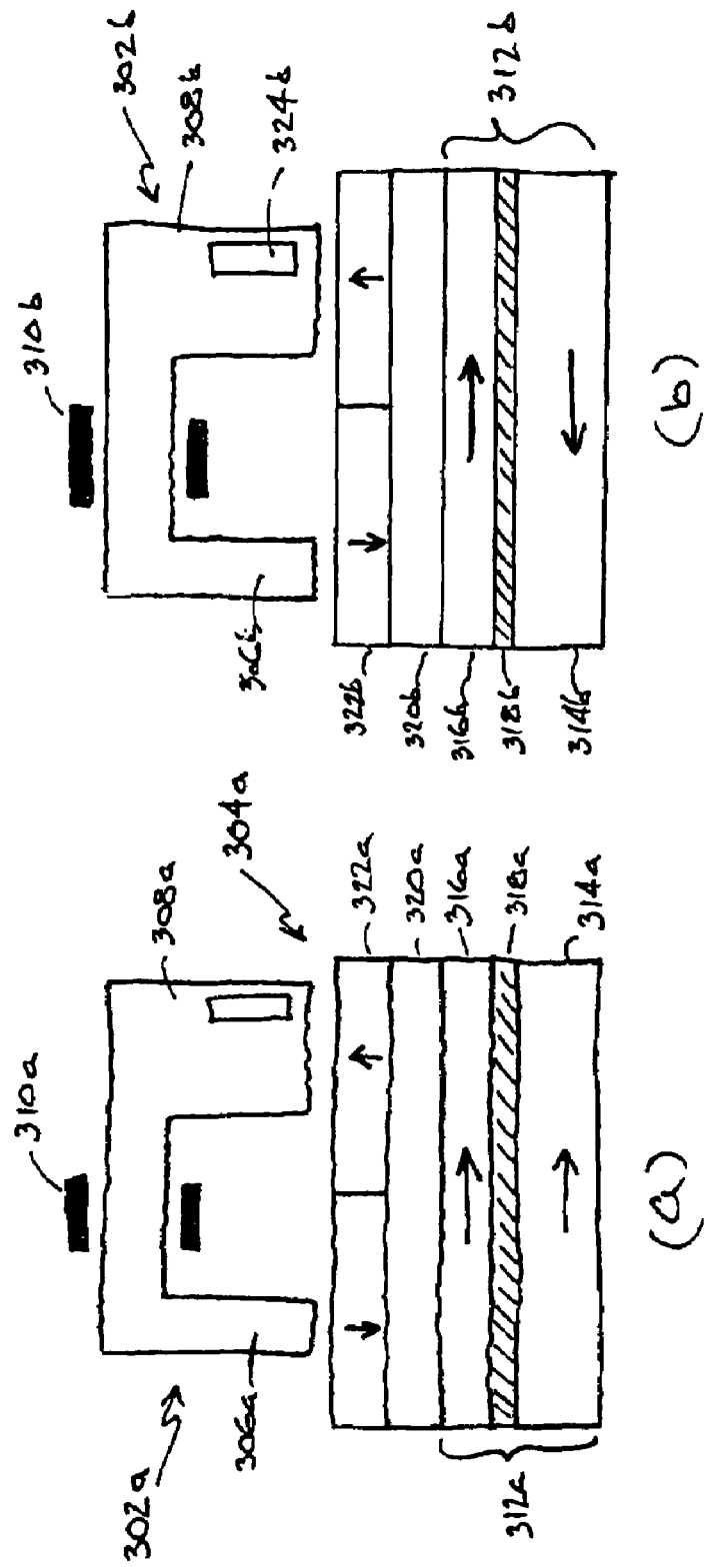
FIG. 3 illustrates a schematic view of a perpendicular write head and a perpendicular recording medium according to an embodiment of the present invention.

The first and second soft underlayers are anti-parallel coupled through the non-magnetic spacer layer. As is illustrated in FIG. 3, during the writing process (FIG. 3a), a perpendicular write head 302a floats above the perpendicular recording medium 304a. The perpendicular write head 302a includes a write pole 306a coupled to a read pole 308a, with an electromagnetic coil 310a wrapped around the write head. The perpendicular recording medium 304a includes a soft underlayer structure 312a having a first soft underlayer 314a that is thicker than the second soft underlayer 316a and is separated therefrom by a non-magnetic spacer layer 318a. An intermediate layer 320a separates the soft underlayer structure 312a from the perpendicular magnetic recording layer 322a. As is illustrated in FIG. 3(a), both of the soft underlayers are magnetized in a parallel configuration during the write operation.

During the read-back process, as illustrated in FIG. 3b, the two soft underlayers 314b and 316b are anti-parallel coupled, resulting in nearly zero net remanence magnetization. The readback process includes the use of a GMR (giant magnetorestrictive) sensor 324b.

The layers of the magnetic recording media according to the present invention can be deposited on the substrate using known deposition techniques. For example, the deposition of the layers under the substrate can be accomplished by physical vapor deposition, e.g., sputtering. Sputtering can be accomplished using gases such as Ar, Kr or Xe. Oxygen can be included in the sputtering gas (reactive sputtering) to form an oxide phase for the magnetic layer. For the underlayer and the magnetic recording layer, it is preferred to sputter at a pressure of from about 2 mTorr to about 150 mTorr. The substrate can be heated prior to sputtering and can be annealed after one or more of the layers has been deposited to relieve residual stresses.

The advantage of the foregoing embodiment with respect to soft underlayer (SUL) noise reduction can be explained as follows. The soft underlayer increases writability of the perpendicular media by increasing the write field magnitude and write field gradient. However, the domains in the soft underlayer contribute to the noise. Also, stray fields in a disk drive can be magnified by the soft underlayer, causing the erasure of written bits. A higher magnetic anisotropy in the soft under layer is essential to reduce these problems, as described by Y. Nakatani, N. Hayashi, Y. Uesaka, and H. Fukushima in "Effect of anisotropy field in soft magnetic underlayer on read/write properties in perpendicular recording media", Journal of Applied Physics, Vol. 93, May 2003. An ideal soft underlayer should have a high magnetic anisotropy field ($H_k$) with an easy magnetization axis along the radial direction. The magnetic anisotropy field is a material property and increasing the anisotropy field leads to higher coercivity, whereas the coercivity of soft underlayer should be low, such as not greater than about 20 Oe. Therefore, for a conventional soft underlayer, the magnetic anisotropy field can not be increased without adversely effecting the coercivity and remnant magnetization.

For the exchange coupled soft underlayer, the anisotropy field is defined as:

$$H_k = (H_k)_{material} + H_{ex}$$

where $(H_k)_{material}$ is the material property and $H_{ex}$ is the exchange field between the first soft underlayer and the second soft underlayer.

Figure 4:
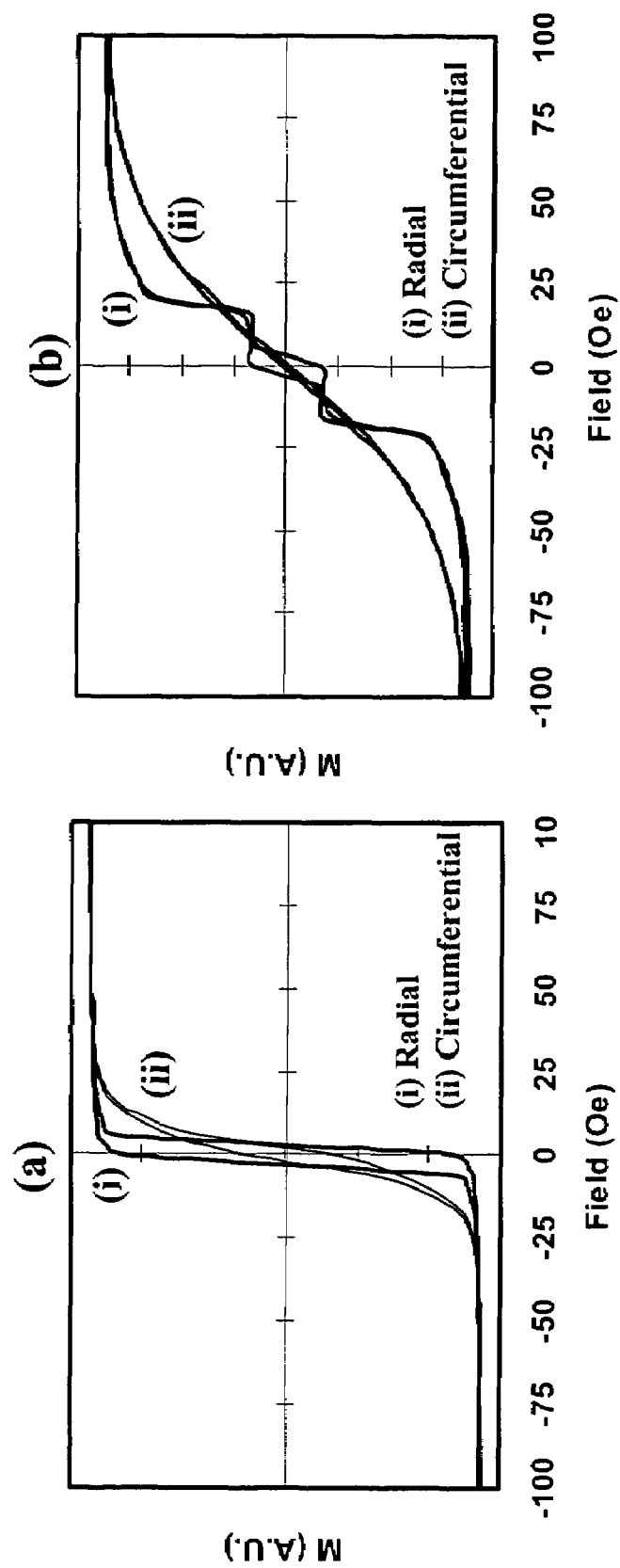
FIG. 4 illustrates M-H loops along radial and circumferential directions for a conventional soft underlayer and a soft underlayer according to an embodiment of the present invention.

FIG. 4 illustrates the M-H loops for a conventional soft underlayer (FIG. 4a) and a soft underlayer according to the present invention (FIG. 4b). Each example demonstrates magnetic anisotropy, with the radial axis being the easy magnetization axis and the circumferential direction being the hard magnetization axis. For a conventional soft underlayer, the conferential M-H curve saturates at about 30 Oe, which corresponds to the anisotropy field. On the other hand, the anisotropy field for a soft underlayer wherein the first soft underlayer is thicker than the second soft underlayer (FIG. 2) is about 90 Oe.

Figure 5:
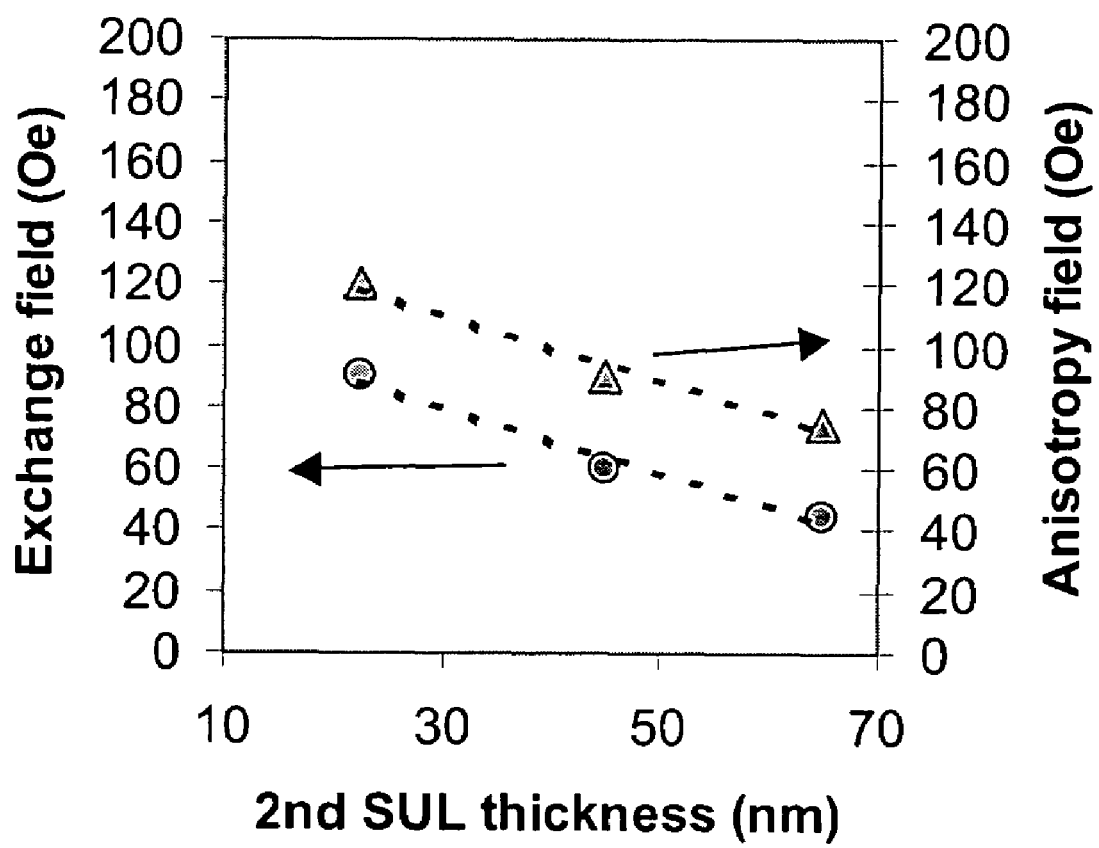
FIG. 5 illustrates the exchange field and anisotropy field as a function of the second underlayer thickness for a soft underlayer structure according to an embodiment of the present invention.

According to the present invention, the exchange field increases with decreasing thickness of the second soft underlayer. This is illustrated by FIG. 5 for an underlayer structure according to the present invention where the thickness of the second soft underlayer is varied. The increase in exchange field further increases the anisotropy field of the soft underlayer. Therefore, the present invention provides a method to increase the anisotropy of the soft underlayer without adversely affecting the coercivity, magnetization or other properties.

A magnetic permeability of greater than about 100 in the soft underlayer is essential for good writability, whereas an even higher permeability value can lead to increased sensitivity to stray fields and also lead to adjacent track erasure of the media. The permeability of the soft underlayer is defined as:

$$4\pi M_S/H_k$$

where $M_S$ is the saturation magnetization and $H_k$ is the anisotropy field. The present invention advantageously provides an independent method to change the permeability of the soft underlayer by changing the anisotropy field.

Figure 6:
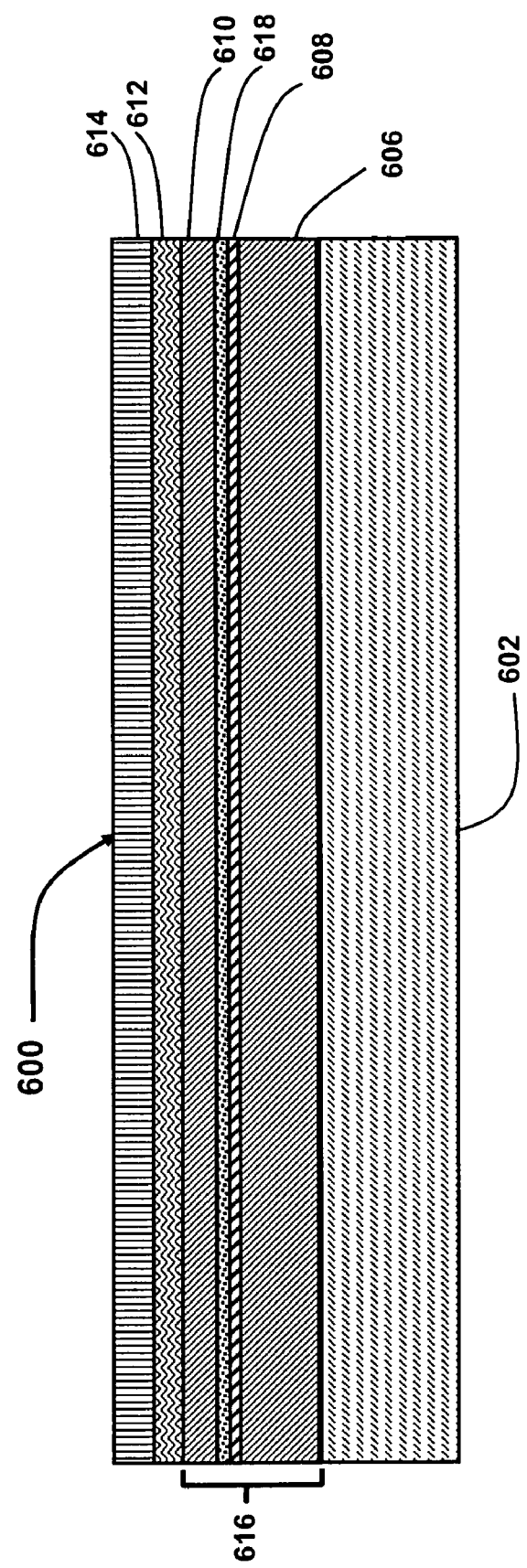
FIG. 6 illustrates a cross-sectional view of a perpendicular recording medium according to the present invention.

Another embodiment of the present invention is illustrated in FIG. 6. In a manner similar to the embodiment illustrated in FIG. 2, the magnetic recording medium 600 illustrated in FIG. 6 includes a substrate 602, a soft underlayer structure 616, an intermediate layer 612 and a perpendicular magnetic recording layer 614. The soft underlayer structure 616 includes a first soft underlayer 606 and a second soft underlayer 610 that are separated by a non-magnetic spacer layer 608.

According to this embodiment, the underlayer structure 616 also includes an exchange enhancement layer 618 disposed between the non-magnetic spacer layer 608 and the second soft underlayer 610. This exchange enhancement layer 618 can be fabricated from Co or a Co-alloy such as CoCr or CoFe, for example, and has a preferred thickness of from about 1 to about 10 nanometers. The exchange enhancement layer 618 advantageously increases the exchange field, which in turn increases the anisotropy field of the soft underlayer structure.

Figure 7:
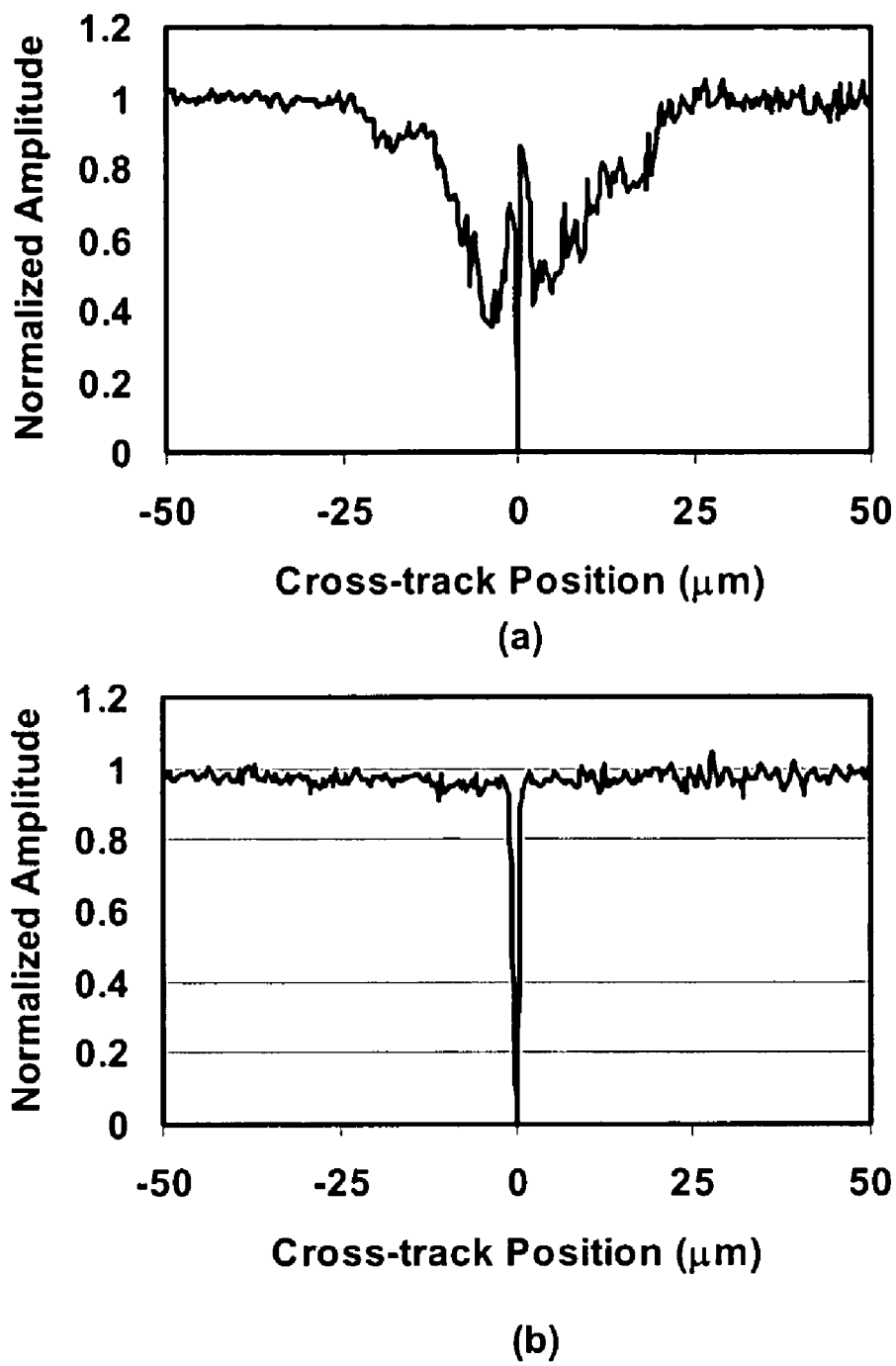
FIG. 7 illustrates the adjacent track erasure for a magnetic recording medium utilizing a conventional soft underlayer and a magnetic recording medium utilizing a soft underlayer structure according to an embodiment of the present invention.

As is illustrated in FIG. 7, the adjacent track erasure for a conventional soft underlayer (FIG. 7a) and a soft underlayer according to the present invention (FIG. 7b) are illustrated. Adjacent track erasure is determined by writing 70 kfci tracks over a wide area. At the middle track position, a 425 kfci pattern is written 10,000 times. The 70 kfci signal is measured at each track and normalized to the original amplitude. The normalized amplitude for 100 tracks for media is illustrated in FIG. 7. The media with a conventional soft underlayer shows severe erasure that extends up to ±25 mm on each side (the dip at zero cross-track position corresponds to the "stressing" track), which corresponds to about 200 tracks near where the writing is occurring. On the other hand, the medium with a soft underlayer according to the present invention does not exhibit any adjacent track erasure.

Figure 8:
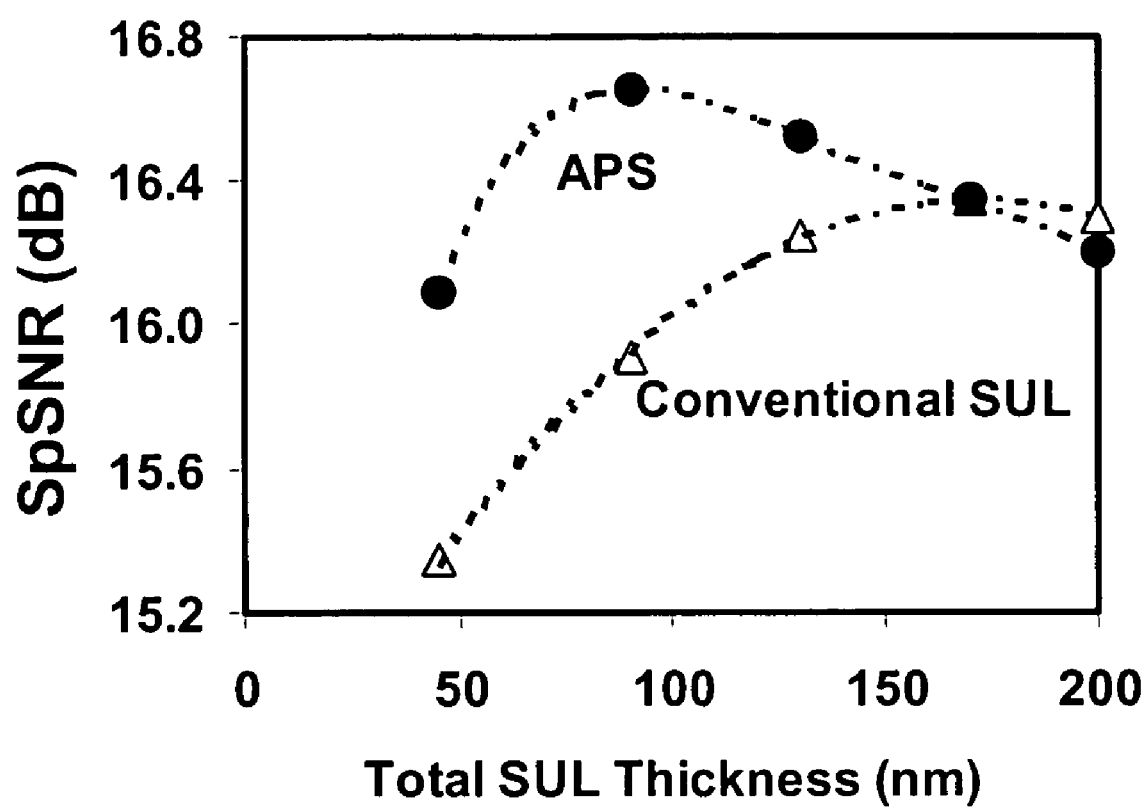
FIG. 8 illustrates the signal to noise ratio (SNR) for a recording media fabricated using a conventional soft underlayer and a soft underlayer according to an embodiment of the present invention.

FIG. 8 illustrates the signal to noise ratio (SNR) for a recording media fabricated using a conventional soft underlayer and a soft underlayer according to the present invention, such as the embodiment illustrated in FIG. 2. The present invention allows the use of a thinner soft underlayer, such as down to about 100 nanometers, where a maximum SNR can be obtained. Higher SNR is very important for achieving higher areal density, whereas a thinner soft underlayer is essential for manufacturability and cost effectiveness of the perpendicular recording media.

According to another embodiment of the present invention, the saturation magnetization ($M_s$) of second soft underlayer is higher than the $M_s$ of the first soft underlayer. According to this embodiment, the magnetic recording medium can have an overall structure similar to that illustrated in FIG. 2, however it is not necessary that he first and second soft magnetic layers have a different thickness and according to this embodiment the layers can have substantially the same thickness. The first soft underlayer can be fabricated from materials such as CoZrTa, CoZrNb or the like whereas the second soft underlayer can be fabricated from materials such as FeCoB, CoFe and the like. For example, the $M_s$ for CoZrTa is about 900 emu/cm$^2$, whereas FeCoB is about 1500 emu/cm$^2$. Preferably, the saturation magnetization of the second soft underlayer is at least about 100 emu/cm$^2$ higher than the first soft underlayer, and more preferably is at least about 400 emu/cm$^2$ higher than the first soft underlayer.

The advantage of the foregoing embodiment in soft underlayer (SUL) noise reduction can be explained as follows. The magnetization patterns in the SUL follow the magnetic fringing fields from the written bits to form a flux closure pattern. A perfectly closed pattern with a small rotation angle is essential. Any uncompensated magnetizations in the SUL could be a noise source for the reader. The anti-parallel exchange-coupling field increases with the decreased thickness of the layer. Therefore, a thinner second soft underlayer experiences a higher anti-parallel exchange field and the exchange field helps to create a small rotation angle for the SUL magnetization and in turn reduces the noise. Higher $M_s$ and a higher exchange field of the thinner second soft underlayer creates a sharp return path for the fringing field from the written bits and improves the SNR substantially.

Figure 9:
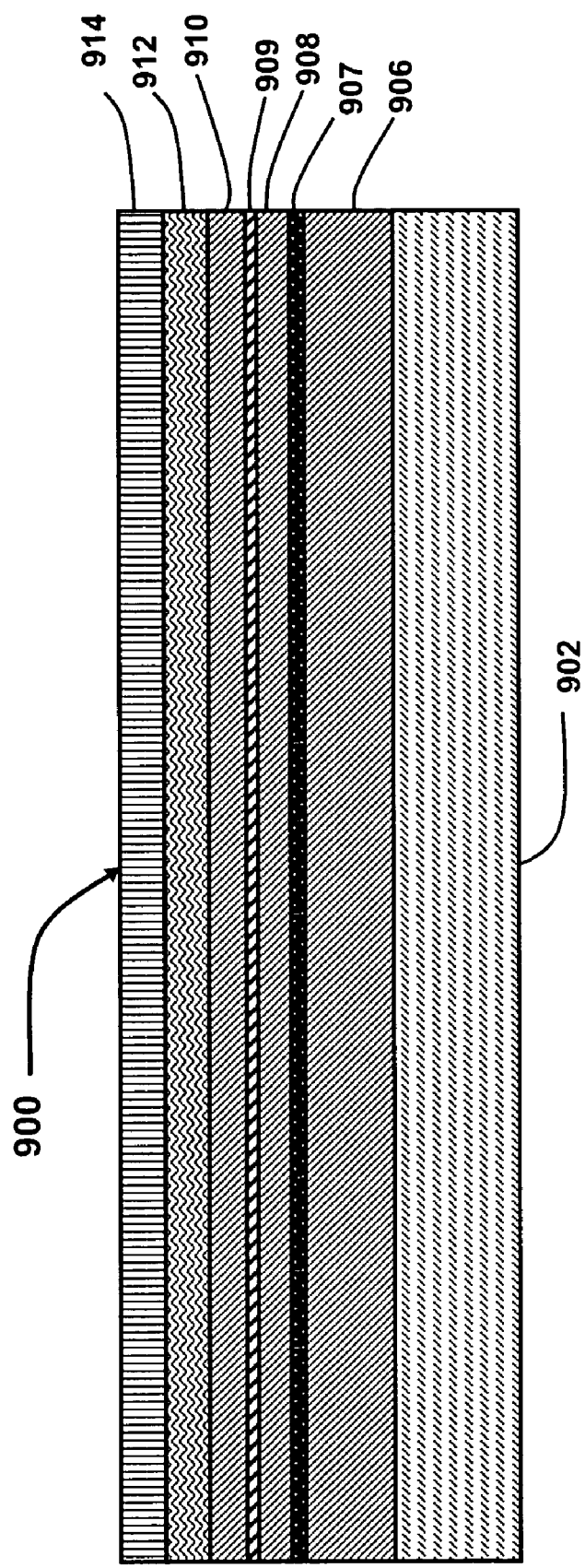
FIG. 9 illustrates a cross-sectional view of a perpendicular recording medium according to an embodiment of the present invention.

Yet another embodiment of the present invention is illustrated in FIG. 9. The perpendicular recording medium 900 includes a soft underlayer structure 916 that includes a thick first soft underlayer 906 and a thinner second soft underlayer 908 and third soft underlayer 910, separated by a first non-magnetic spacer layer 907, such as a carbon, Ta or Ta-oxide. The second soft underlayer 908 and third soft underlayer 910 are soft underlayers of approximately the same magnetization thickness product and are anti-parallel coupled through a second non-magnetic spacer layer 909, such as Ru. The total thickness of layers 908, 909 and 910 can preferably be from about 20 to 80 nanometers and the thickness of the first soft underlayer 906 can preferably be from about 50 to 150 nanometers. In one example, the thickness of the first, second and third underlayers can be about 120 nanometers, 20 nanometers and 20 nanometers, respectively. According to this embodiment, while the total thickness of the three soft underlayers serves as the flux return path during writing operations, the anti-parallel coupled SUL2/Ru/SUL3 structure decreases the noise from the SUL and also decreases the PW$_{50}$, particularly for thin intermediate layers.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A magnetic recording medium for perpendicular recording, comprising:
   a) a substrate;
   b) an underlayer structure disposed over said substrate, said underlayer structure comprising:
      i) a first soft magnetic underlayer having a first thickness;
      ii) a second soft magnetic underlayer having a second thickness and a third soft magnetic layer having a third thickness disposed over said first soft underlayer;
      iii) a first non-magnetic spacer layer disposed between said first and second soft magnetic underlayers; and
      iv) a second non-magnetic spacer layer disposed between said second soft magnetic underlayer and said third soft magnetic underlayer, wherein said second and said third soft magnetic underlayers are anti-parallel coupled through said second non-magnetic spacer layer, and wherein said first thickness is greater than said second thickness and is greater than said third thickness;
   c) an intermediate layer disposed over said underlayer structure; and
   d) a perpendicular magnetic recording layer disposed over said intermediate layer.

2. A magnetic recording medium as recited in claim 1, wherein said substrate comprises aluminum coated with NiP.

3. A magnetic recording medium as recited in claim 1, wherein said first thickness is from about 50 nanometers to about 150 nanometers.

4. A magnetic recording medium as recited in claim 1, wherein the total thickness of said second soft magnetic underlayer, said third soft magnetic underlayer and said second non-magnetic spacer layer is from about 20 nanometers to about 80 nanometers.

5. A magnetic recording medium as recited in claim 1, wherein said second thickness and said third thickness are substantially the same.

6. A magnetic recording medium as recited in claim 1, wherein said first, second and third soft magnetic layers have a coercivity of not greater than about 10 Oe.

7. A magnetic recording medium as recited in claim 1, wherein said first, second and third soft magnetic layers have a relative magnetic permeability of at least about 50.

8. A magnetic recording medium as recited in claim 1, wherein said first, second and third soft magnetic underlayers are fabricated from the same magnetic material.

9. A magnetic recording medium as recited in claim 1, wherein at least one of said first, second and third soft magnetic underlayers is fabricated from a material selected from the group consisting of CoZrNb, CoZrTa, FeCoB and FeTaC.

10. A magnetic recording medium as recited in claim 1, wherein said first non-magnetic spacer layer is selected from the group consisting of carbon, Ta or Ta-oxide.

11. A magnetic recording medium as recited in claim 1, wherein said second non-magnetic spacer layer is fabricated from Ru.

12. A magnetic recording medium as recited in claim 1, wherein said intermediate layer comprises a first intermediate sub-layer and a second intermediate sub-layer.

13. A magnetic recording medium as recited in claim 1, wherein said intermediate layer comprises a first intermediate sub-layer selected from the group consisting of Ta, Ti or alloys thereof and a second intermediate sub-layer selected from the group consisting of Ru and alloys thereof.

14. A magnetic recording medium as recited in claim 1, wherein said intermediate layer comprises a first intermediate sub-layer having a thickness of from about 1 nanometers to about 3 nanometers and a second intermediate sub-layer having a thickness of from about 5 nanometers to about 40 nanometers.

15. A magnetic recording medium as recited in claim 1, wherein said perpendicular recording layer comprises an oxide selected from the group consisting of oxides of CoCrPt, CoCrPtB, CoCrPtSi and CoCrPtBSi.

16. A magnetic recording medium as recited in claim 1, wherein said first thickness is greater than the sum total thickness of said second thickness and said third thickness.

17. A magnetic recording medium as recited in claim 1, wherein said first thickness is from about 50 nanometers to about 150 nanometers and wherein the sum total thickness of said second soft magnetic underlayer, said third soft magnetic underlayer and said second non-magnetic spacer layer is from about 20 nanometers to about 80 nanometers.

* * * * *